(12) United States Patent
D'Haese et al.

(10) Patent No.: US 9,701,873 B2
(45) Date of Patent: Jul. 11, 2017

(54) HIGHLY TACKIFIED ACRYLATE PRESSURE SENSITIVE ADHESIVES

(71) Applicant: 3M INNOVATIVE PROPERTIES COMPANY, St. Paul, MN (US)

(72) Inventors: Francois C. D'Haese, Antwerp (BE); Stijn A. D'hollander, Tielrode (BE); Petra M. Stegmaier, Duesseldorf (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/442,874

(22) PCT Filed: Nov. 5, 2013

(86) PCT No.: PCT/US2013/068376
§ 371 (c)(1),
(2) Date: May 14, 2015

(87) PCT Pub. No.: WO2014/078118
PCT Pub. Date: May 22, 2014

(65) Prior Publication Data
US 2015/0291853 A1    Oct. 15, 2015

(30) Foreign Application Priority Data

Nov. 19, 2012 (EP) .................... 12193296

(51) Int. Cl.
| | |
|---|---|
| *C08F 2/46* | (2006.01) |
| *C08F 2/50* | (2006.01) |
| *C08G 61/04* | (2006.01) |
| *C09J 7/02* | (2006.01) |
| *C09J 133/02* | (2006.01) |
| *C09J 133/08* | (2006.01) |

(52) U.S. Cl.
CPC ........... *C09J 7/0217* (2013.01); *C09J 133/02* (2013.01); *C09J 133/08* (2013.01); *C08L 2312/06* (2013.01); *C09J 2433/00* (2013.01)

(58) Field of Classification Search
CPC .... C09J 7/0217; C09J 2433/00; C09J 133/08; C09J 133/02; C08L 2312/06

USPC .......... 522/65, 6, 71, 189, 184, 1, 68; 520/1
See application file for complete search history.

(56) References Cited

U.S. PATENT DOCUMENTS

| | | |
|---|---|---|
| 4,330,590 A | 5/1982 | Vesley |
| 4,379,201 A | 4/1983 | Heilmann et al. |
| 4,602,097 A | 7/1986 | Curtis |
| 4,737,559 A | 4/1988 | Kellen et al. |
| 5,407,971 A | 4/1995 | Everaerts et al. |
| 5,686,504 A * | 11/1997 | Ang ................... C09J 133/08 522/46 |
| 6,586,491 B2 | 7/2003 | Husemann et al. |
| 8,791,207 B2 | 7/2014 | Steelman et al. |
| 2010/0137469 A1 | 6/2010 | Zhu et al. |
| 2011/0104486 A1 | 5/2011 | Ma et al. |
| 2011/0318579 A1 | 12/2011 | Husemann et al. |
| 2013/0184394 A1* | 7/2013 | Satrijo ................... C09J 7/0217 524/502 |

FOREIGN PATENT DOCUMENTS

| | | |
|---|---|---|
| WO | WO 97/40090 | 10/1997 |
| WO | 2012044529 | * 4/2012 |
| WO | WO 2012/044529 | 4/2012 |

OTHER PUBLICATIONS

PCT International Search Report for PCT/US2013/068376 mailed on Jan. 9, 2014, 4 pages.

* cited by examiner

*Primary Examiner* — Jessica E Whiteley
(74) *Attorney, Agent, or Firm* — Philip Y. Dahl; Dena Ehrich

(57) ABSTRACT

The present invention relates to a radiation crosslinkable pressure sensitive adhesive precursor comprising: a) an acrylate base polymer; b) a co-polymerized type (II) photocrosslinker, in a amount greater than 0.05 parts by weight per 100 parts by weight of acrylate base polymer; c) a co-polymerized hydrogen-donating monomer; and d) a tackifying resin, in an amount greater than 40 parts by weight per 100 parts by weight of acrylate base polymer. The present invention is also directed to a method of preparing a radiation crosslinked pressure sensitive adhesive.

18 Claims, No Drawings

HIGHLY TACKIFIED ACRYLATE PRESSURE SENSITIVE ADHESIVES

TECHNICAL FIELD

The present disclosure relates generally to the field of adhesives, more specifically to the field of photocrosslinked pressure sensitive adhesives which contain relatively high levels of tackifying agents. The present disclosure is also directed to a method of preparing highly tackified photocrosslinked pressure sensitive adhesives.

BACKGROUND

Adhesives have been used for a variety of marking, holding, protecting, sealing and masking purposes. Adhesive tapes generally comprise a backing, or substrate, and an adhesive. One type of adhesive, a pressure sensitive adhesive, is particularly preferred for many applications. Pressure sensitive adhesives (PSA's) are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength.

Materials that have been found to function well as pressure sensitive adhesives are polymers designed and formulated to exhibit the requisite viscoelastic properties resulting in a desired balance of tack, peel adhesion, and shear strength. The most commonly used polymers for preparation of pressure sensitive adhesives are natural rubber, synthetic rubbers (e.g., styrene/butadiene copolymers (SBR) and styrene/isoprene/styrene (SIS) block copolymers), various (meth)acrylate (e.g., acrylate and methacrylate) copolymers and silicones.

General purpose tapes which stick to all types of surfaces and especially pressure sensitive adhesives which stick very well to Low Surface Energy substrates typically require addition of high amounts of tackifying resins. PSA's prepared from solution polymer may compensate for the reduced cohesive strength, due to the presence of low molecular weight tackifying resin, with appropriate addition of crosslinkers or increased molecular weight of the polymer. In hot melt processable formulations though, the polymer has to be able to flow sufficiently at extruder temperature and therefore the maximum molecular weight is limited. Furthermore, the combination with thermal crosslinkers to create a higher cohesive strength via an increase of the molecular weight and the creation of a chemical network is not always practical because of its potential implications during hotmelt processing.

It is known that crosslinking of polymers produces polymer networks which have quite different mechanical and physical properties compared to their uncrosslinked linear or branched counterparts. For example, polymer networks can show such unique and highly desirable properties as solvent resistance, high cohesive strength, and elastomeric character.

Crosslinked polymers can be made in situ during formation of the desired polymer product. Many patents are known describing techniques to achieve efficient crosslink mechanisms and good cohesive strength properties. Therefore, the problems associated with solvent and bulk processing of crosslinked materials may be avoided through the use of actinic radiation processing. U.S. Pat. No. 4,379,201 (Heilmann et al.) discloses an example of a class of polyacrylic-functional crosslinkers used in the photocuring of (meth)acrylate copolymers.

U.S. Pat. No. 4,391,678 (Vesley) and U.S. Pat. No. 4,330,590 (Vesley) describe a class of fast curing triazine photocrosslinkers which, when mixed with an acrylic monomer and, optionally, a monoethylenically unsaturated monomer, and exposed to UV radiation, forms a crosslinked polyacrylate. The crosslinks formed by both the (meth) acrylates and the triazines in these copolymerizations prevent any further processing, such as hot melt coating, reactive extrusion, or solution coating processes, following the initial photopolymerization. However, since further processing of the polymer product is often necessary, it is more typical to start from the linear or branched polymer which, in the final processing step, is cured to a crosslinked material. The curing or crosslinking step is typically activated by moisture, thermal energy or actinic radiation. The latter has found widespread applications, particularly in the use of ultraviolet light as the radiation source.

In the past, a variety of different materials have been used as crosslinking agents using actinic radiation, e.g. polyfunctional acrylates, acetophenones, benzophenones, and triazines. The foregoing crosslinking agents may however possess certain drawbacks which include one or more of the following: high volatility; incompatibility with certain polymer systems; generation of corrosive or toxic by-products; generation of undesirable color; requirement of a separate photoactive compound to initiate the crosslinking reaction and high sensitivity to oxygen.

In addition to actinic radiation processing described above, acrylate PSAs can be applied to substrates by solvent and hot-melt coating techniques. Although solvent coating techniques are widely used, hot-melt coating techniques may provide some environmental and economical advantages. However, unlike solvent coating techniques where the polymer coating and crosslinking are performed simultaneously, hot-melt coating requires that coating and crosslinking be performed sequentially. This is due to competing considerations: a polymer should not be highly crosslinked if it is to be hot-melt coated smoothly, yet the polymer needs to be crosslinked to achieve certain desirable performance properties such as e.g. high shear when the polymer is a PSA. Therefore, hot-melt coating is performed prior to crosslinking of the coated polymer.

Because hot-melt coating techniques involve high amounts of thermal energy and shear, the subsequent crosslinking procedure usually involves non-thermal energy sources. Electron beam (e-beam) and ultraviolet (UV) energy sources have been used traditionally, although e-beam techniques often are too energy intensive to be practical. Accordingly, much interest has been focused on UV radiation crosslinking of polymers.

UV radiation crosslinking of coated polymers has relied almost exclusively on hydrogen abstraction techniques in which a hydrogen abstracting agent, such as e.g. benzophenone or anthraquinone, is blended into the coated mixture prior to or during the coating process, and the mixture is then exposed to appropriate UV radiation. Certain polyfunctional benzophenones have been investigated as photocrosslinking agents and/or photosensitizers in various photopolymerizable systems.

To date, there is no disclosure of any highly tackified radiation crosslinkable PSA formulations, in particular solventless PSA formulations, which include an incorporated photocrosslinker at levels higher than 0.05 parts by weight per 100 parts of polymeric material, and which after suitable radiation crosslinking provides a highly tackified radiation crosslinked pressure sensitive adhesive in particular provides high cohesive strength at elevated temperature and high-temperature shear resistance whilst ensuring excellent adhesion to various types of substrates.

Also, when a tackifying resin is present in the PSA formulation, especially in a relatively high amount, a large fraction of the exposed UV light during the crosslinking step is absorbed by the tackifying resin/photocrosslinker system which may result in reduced crosslinking efficiency and poor cohesive strength of the resulting PSA. When radiation crosslinking is used to crosslink tackified PSA formulations, the tackifying resin may provoke several other deleterious effects such as e.g. undesired chain transfer or chain termination reactions. The use of high levels of tackifying agent(s) may be desirable because it can increase the tackiness of the pressure sensitive adhesive, making it aggressively adhere to wide range of substrates without the need to apply pressure. The addition of tackifying resin, especially high levels of tackifying resin, may detrimentally affect the shear and cohesive strength of a pressure sensitive adhesive, and may even raise the Tg of the adhesive. The use of high levels of tackifying resin may be particularly detrimental to hot melt processable pressure sensitive adhesives where the need to be hot melt processable can already adversely affect the shear strength and cohesive strength properties of the adhesive.

U.S. Pat. No. 4,737,559 (Kellen et al.) discloses a PSA which is a copolymer of an acrylate monomer and a copolymerizable mono-ethylenically unsaturated aromatic ketone comonomer free of ortho-aromatic hydroxyl groups. WO-A1-97/40090 (Stark et al.) describes a radiation crosslinkable composition comprising: a) a radiation crosslinkable polymer having abstractable hydrogen atoms and radiation-activatable crosslinking groups capable of abstracting hydrogen atoms when activated; and b) a non-polymerizable radiation-activatable crosslinking agent capable of abstracting hydrogen atoms when activated. WO-A1-96/35725 (Carpenter) discloses pigmented, UV-crosslinked, acrylic-based, pressure sensitive adhesives claimed to have high cohesive strength and high-temperature shear resistance. The adhesives disclosed in WO-A1-96/35725 comprise an acrylic copolymer compounded with a pigment and a hydrogen-abstracting photoinitiator, wherein the acrylic copolymer is obtained by copolymerizing an alkyl acrylate and a tertiary amine-containing monomer. WO-A1-2012/044529 (Satrijo et al.) describes a hot-melt processable PSA comprising: a) a hot-melt processable elastomeric (meth)acrylate random co-polymer; b) at least one tackifing resin comprising greater than 50 parts by weight per 100 parts by weight of elastomeric (meth)acrylate random co-polymer; and c) a thermoplastic material.

Without contesting the technical advantages associated with the solutions disclosed in the art, there is still a need for a highly tackified radiation crosslinked pressure sensitive adhesive which overcomes the deficiencies previously mentioned, and which in particular provides high cohesive strength at elevated temperature and high-temperature shear resistance whilst ensuring excellent adhesion to various types of substrates.

Other advantages of the pressure sensitive adhesives, precursors of pressure sensitive adhesive and methods of the invention will be apparent from the following description.

SUMMARY

According to one aspect, the present disclosure relates to a radiation crosslinkable pressure sensitive adhesive precursor comprising:

a) an acrylate base polymer;
   b) a co-polymerized type (II) photocrosslinker, in a amount greater than 0.05 parts by weight per 100 parts by weight of acrylate base polymer;
   c) a co-polymerized hydrogen-donating monomer; and
   d) a tackifying resin, in an amount greater than 40 parts by weight per 100 parts by weight of acrylate base polymer.

According to another aspect, the present disclosure relates to a method of preparing a radiation crosslinked pressure sensitive adhesive, comprising the steps of:

a) providing a radiation crosslinkable pressure sensitive adhesive precursor as above-described; and
   b) radiation crosslinking the radiation crosslinkable pressure sensitive adhesive precursor.

In still another aspect, the present disclosure relates to the use of a radiation crosslinkable pressure sensitive adhesive precursor as above described, for the manufacture of an adhesive tape, preferably a double-sided tape.

DETAILED DESCRIPTION

The present invention provides a highly tackified radiation crosslinked pressure sensitive adhesive which is, in particular, provided with high cohesive strength at elevated temperature whilst ensuring excellent adhesion to various types of substrates, in particular low surface energy substrates. In particular, the present invention provides versatile highly tackified radiation crosslinkable PSA formulations, in particular solventless PSA formulations, which include an incorporated photocrosslinker at levels higher than 0.05, in particular greater than 0.10, more in particular greater than 0.15 parts by weight per 100 parts of polymeric material, and which after suitable radiation crosslinking step produces highly tackified pressure sensitive adhesives having beneficial properties.

Accordingly and in a first aspect, the present invention relates to a radiation crosslinkable pressure sensitive adhesive precursor comprising:

a) an acrylate base polymer;
   b) a co-polymerized type (II) photocrosslinker, in a amount greater than 0.05, in particular greater than 0.10, more in particular greater than 0.15 parts by weight per 100 parts by weight of acrylate base polymer;
   c) a co-polymerized hydrogen-donating monomer; and
   d) a tackifying resin, in an amount greater than 40 parts by weight per 100 parts by weight of acrylate base polymer.

In the context of the present invention, the term "adhesive" as used herein refers to polymeric compositions useful to adhere together two adherends. Examples of adhesives are pressure sensitive adhesives.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength. Materials that have been found to function well as pressure sensitive adhesives are polymers designed and formulated to exhibit the requisite viscoelastic properties resulting in a desired balance of tack, peel adhesion, and shear holding power.

In the context of the present invention, the term "acrylate" refers to monomeric acrylic or methacrylic esters of alcohols. Acrylate and methacrylate monomers, oligomers, or polymers are referred to collectively herein as "acrylates".

As will be apparent to those skilled in the art, the term "type (II) photocrosslinker", used throughout the present description, is meant to refer to a photocrosslinker, which upon irradiation, becomes excited to a higher energy state in which it can abstract a hydrogen atom from a hydrogen-donating molecule, thereby generating on the hydrogen-donating molecule a free radical capable of further reaction, such as e.g. free radical addition polymerization, free radical addition crosslinking. The expression "co-polymerized type (II) photocrosslinker" is meant to reflect that the photocrosslinker is co-polymerized with any suitable polymeric matrix, including the acrylate base polymer and the crosslinking polymer, as defined hereinbelow.

In the context of the present invention still, the term "hydrogen-donating monomer" used throughout the description, is meant to designate a monomer which is capable of (relatively easily) donating a hydrogen atom (abstractable hydrogen atom) to a photocrosslinker which, upon irradiation, is excited to a higher energy state which makes it capable of abstracting an abstractable hydrogen atom, from e.g. a hydrogen-donating monomer. The expression "co-polymerized hydrogen-donating monomer" is meant to reflect that the hydrogen-donating monomer is co-polymerized with any suitable polymeric matrix, including the acrylate base polymer and the crosslinking polymer, as defined hereinbelow.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and 2-ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The terms "glass transition temperature" and "Tg" are used interchangeably and refer to the glass transition temperature of a material or a mixture. Unless otherwise indicated, glass transition temperature values are determined by Differential Scanning calorimetry (DSC).

The radiation crosslinkable pressure sensitive adhesive precursor according to a first aspect of the present invention, comprises an acrylate base polymer. Suitable acrylate base polymer for use herein will be easily identified by those skilled in the art, in the light of the present description.

In a preferred aspect, the acrylate base polymer for use in the present invention, is prepared from a polymerizable mixture comprising at least one linear or branched alkyl (meth)acrylate monomer, wherein the linear or branched alkyl group of the alkyl(meth)acrylate monomer preferably comprises from 1 to 24, more preferably from 4 to 20, even more preferably 6 to 15, still more preferably from 6 to 10 carbon atoms.

In a preferred aspect, the linear or branched alkyl(meth) acrylate monomer is selected from the group consisting of methyl acrylate, ethyl acrylate, n-propyl acrylate, isopropyl acrylate, n-butyl acrylate, isobutyl acrylate, n-pentyl acrylate, iso-pentyl acrylate, n-hexyl acrylate, iso-hexyl acrylate, cyclohexyl acrylate, octyl acrylate, iso-octyl acrylate, 2-ethylhexyl acrylate, decyl acrylate, lauryl acrylate, 2-propylheptyl acrylate, stearyl acrylate, isobornyl acrylate, octadecyl acrylate, nonyl acrylate, dodecyl acrylate, and any combinations or mixtures thereof. Also useful are aromatic acrylates, acrylates containing aryl groups, e.g., benzyl acrylate and cyclobenzyl acrylate.

More preferably, the alkyl(meth)acrylate monomer for use herein is selected from the group consisting of iso-octyl acrylate, 2-ethylhexyl acrylate, butyl acrylate, and any combinations or mixtures thereof. Still more preferably, the alkyl(meth)acrylate monomer for use herein comprises (or consists of) iso-octyl acrylate.

Typically, the acrylate base polymer for use in the present invention is prepared from a monomer mixture comprising from 50 to 100 parts, from 70 to 100 parts, from 80 to 100 parts, or even from 90 to 100 parts by weight of at least one linear or branched alkyl(meth)acrylate monomer, wherein the linear or branched alkyl group of the alkyl(meth)acrylate monomer preferably comprises from 1 to 24, more preferably from 4 to 20, even more preferably 6 to 15, still more preferably from 6 to 10 carbon atoms.

Optionally, one or more monoethylenically unsaturated co-monomers may be present in the (pre-polymerization) monomer mixture used to prepare the acrylate base polymer, in an amount of from 0.5 to 50 parts co-monomer, and are thus typically polymerized with the acrylate monomers. One class of useful co-monomers includes those having a homopolymer glass transition temperature greater than the glass transition temperature of the acrylate homopolymer. Sometimes these monomers are referred to as "reinforcing co-monomers". Typically these monomers have a homopolymer glass transition temperature greater than 20° C. Examples of suitable co-monomers falling within this class include acrylic acid, itaconic acid, methacrylic acid, acrylonitrile, methacrylonitrile, vinyl acetate, isobornyl acrylate, cyano ethyl acrylate, maleic anhydride, hydroxyalkylacrylates, beta-carboxyethyl acrylate, vinyl esters of neodecanoic, neononanoic, neopentanoic, 2-ethylhexanoic, or propionic acids (e.g., available from Union Carbide Corp. of Danbury, Conn. under the designation "Vynates"), vinylidene chloride, styrene, vinyl toluene, alkyl vinyl ethers, and any combinations or mixtures thereof. Preferred co-monomer for use herein includes, but is not limited to, acrylic acid. When present, the monoethylenically unsaturated co-monomer is typically used in amounts ranging from 0.5 to 25, from 1.0 to 15, from 1.0 to 8.0, from 2.0 to 6.0, or even from 3.0 to 5.0 parts, by weight per 100 parts by weight of acrylate base polymer.

A second class of useful co-monomers includes those having a homopolymer glass transition temperature less than the glass transition temperature of the acrylate homopolymer. Examples of suitable co-monomers falling within this class include ethoxyethoxy ethyl acrylate (Tg=−71° C.) and methoxypolyethylene glycol 400 acrylate (Tg=−65° C.; available from Shin Nakamura Chemical Co., Ltd. under the designation "NK Ester AM-90G").

Accordingly, in some preferred aspects of the radiation crosslinkable pressure sensitive adhesive precursor of the invention, the acrylate base polymer (or the pre-polymerization monomer mixture used to prepare the acrylate base polymer) comprises a co-polymer of at least one (meth)acrylate monomer, preferably an alkyl(meth)acrylate monomer.

In a preferred aspect, the acrylate base polymer comprises a co-polymer of iso-octyl acrylate, 2-ethylhexyl acrylate, or butyl acrylate and acrylic acid.

In some other preferred aspects, the acrylate base polymer (or the pre-polymerization monomer mixture used to prepare the acrylate base polymer) further comprises a photocrosslinker, preferably a co-polymerized type (II) photocrosslinker, as defined hereinbelow.

Additionally, one or more multifunctional ethylenically unsaturated monomers may be included in the pre-polymerization monomer mixture used to prepare the acrylate base polymer, typically in low concentration. Examples of such multifunctional ethylenically unsaturated monomers include, for example, multifunctional (meth)acrylate monomers. Multifunctional (meth)acrylates include tri(meth)acrylates and di(meth)acrylates (that is, compounds comprising three or two (meth)acrylate groups). Typically di(meth)acrylate monomers (that is, compounds comprising two (meth)acrylate groups) are used. Useful tri(meth)acrylates include, for example, trimethylolpropane tri(meth)acrylate, propoxylated trimethylolpropane triacrylates, ethoxylated trimethylolpropane triacrylates, tris(2-hydroxyethyl)isocyanurate triacrylate, and pentaerythritol triacrylate. Useful di(meth)acrylates include, for example, ethylene glycol di(meth)acrylate, diethylene glycol di(meth)acrylate, triethylene glycol di(meth)acrylate, tetraethylene glycol di(meth)acrylate, 1,4-butanediol di(meth)acrylate, 1,6-hexanediol di(meth)acrylate, alkoxylated 1,6-hexanediol diacrylate, tripropylene glycol diacrylate, dipropylene glycol diacrylate, cyclohexane dimethanol di(meth)acrylate, alkoxylated cyclohexane dimethanol diacrylates, ethoxylated bisphenol A di(meth)acrylates, neopentyl glycol diacrylate, polyethylene glycol di(meth)acrylates, polypropylene glycol di(meth)acrylates, and urethane di(meth)acrylates. The branching agent 1,6-hexanediol diacrylate (HDDA) is particularly suitable. Typically the di(meth)acrylate branching agent is used in amounts ranging from 0.001 to 0.05 parts by weight per 100 parts by weight of acrylate base polymer.

Generally, the pre-polymerization monomer mixture used to prepare the acrylate base polymer, includes an appropriate initiator. For polymerization by ultraviolet light, a photoinitiator is included. Useful photoinitiators include substituted acetophenones such as benzyl dimethyl ketal and 1-hydroxycyclohexyl phenyl ketone, substituted alpha-ketols such as 2-methyl-2-hydroxypropiophenone, benzoin ethers such as benzoin methyl ether, benzoin isopropyl ether, substituted benzoin ethers such as anisoin methyl ether, aromatic sulfonyl chlorides, photoactive oximes and azo-type initiators. The photoinitiator may be used in an amount from about 0.001 to about 5.0 parts by weight, preferably from about 0.01 to about 5.0 parts by weight, more preferably in an amount from 0.05 to 0.5 parts by weight, and more preferably in an amount from 0.05 to 0.3 parts by weight per 100 parts by weight of total monomer.

The pre-polymerization monomer mixture used to prepare the acrylate base polymer, may also be polymerized by thermal polymerization or by a combination of thermal and radiation polymerization. For thermal polymerization, a thermal initiator is included. Thermal initiators useful in the present invention include, but are not limited to azo, peroxide, persulfate, and redox initiators. Azo-type initiators, such as e.g. the "Vazo" line, commercially available from DuPont Chemical Co, are particularly preferred. The thermal initiator may be used in an amount from about 0.01 to about 5.0 parts by weight per 100 parts by weight of total monomer, preferably from 0.025 to 2 weight percent.

The radiation crosslinkable pressure sensitive adhesive precursor according to a first aspect of the present invention, further comprises a co-polymerized type (II) photocrosslinker. Suitable co-polymerized type (II) photocrosslinkers for use herein will be easily identified by those skilled in the art, in the light of the present description.

In some exemplary aspects, the co-polymerized type (II) photocrosslinkers for use in the present invention are selected from the group consisting of mono- and multi-ethylenically unsaturated aromatic ketone comonomers free of ortho-aromatic hydroxyl groups such as those disclosed in U.S. Pat. No. 4,737,559 (Kellen et al.). Specific examples of mono-ethylenically unsaturated aromatic ketone comonomers include the copolymerizable photosensitive crosslinkers para-acryloxybenzophenone (ABP), para-acryloxyethoxybenzophenone (AEBP), para-N-(methylacryloxyethyl)-carbamoylethoxybenzophenone, 4-acryloyloxydiethoxy-4-chlorobenzophenone, para-acryloxyacetophenone, ortho-acrylamidoacetophenone, acrylated anthraquinones, and any combinations or mixtures thereof.

In a preferred aspect, the co-polymerized type (II) photocrosslinker for use in the present invention is selected from the group of mono-ethylenically unsaturated aromatic ketones. More preferably, the co-polymerized type (II) photocrosslinker for use in the present invention is selected from the group consisting of para-acryloxybenzophenone (ABP), para-acryloxyethoxybenzophenone (AEBP), para-N-(methylacryloxyethyl)-carbamoylethoxybenzophenone, 4-acryloyloxydiethoxy-4-chlorobenzophenone, para-acryloxyacetophenone, ortho-acrylamidoacetophenone, acrylated anthraquinones, and any combinations or mixtures thereof. Even more preferably, the co-polymerized type (II) photocrosslinker for use in the present invention is selected from the group consisting of para-acryloxybenzophenone (ABP), para-acryloxyethoxybenzophenone (AEBP), and any combinations or mixtures thereof.

The co-polymerized type (II) photocrosslinkers may typically be used in an amount from 0.06 to 1 parts, from 0.11 to 1 parts, from 0.16 to 1 parts, from 0.18 to 0.70 parts, or even from 0.20 to 0.50 parts by weight per 100 parts by weight of acrylate base polymer (or of pre-polymerization monomer mixture used to prepare the acrylate base polymer).

In one exemplary aspect of the radiation crosslinkable pressure sensitive adhesive precursor of the invention, the co-polymerized type (II) photocrosslinker for use herein may be co-polymerized into the acrylate base polymer, i.e. co-polymerized together with the other monomers present into the pre-polymerization monomer mixture used to prepare the acrylate base polymer.

In an alternative exemplary aspect of the radiation crosslinkable pressure sensitive adhesive precursor of the invention, the co-polymerized type (II) photocrosslinker for use herein may be co-polymerized into a crosslinking polymer, preferably an acrylate crosslinking polymer, as detailed herein below, and distinct from the acrylate base polymer, i.e. co-polymerized together with the other monomers present into the pre-polymerization monomer mixture used to prepare the crosslinking polymer.

The radiation crosslinkable pressure sensitive adhesive precursor according to a first aspect of the present invention, further comprises a co-polymerized hydrogen-donating monomer. Suitable co-polymerized hydrogen-donating monomers for use herein will be easily identified by those skilled in the art, in the light of the present description.

Exemplary co-polymerized hydrogen-donating monomers include, but are not limited to, monomers comprising at least one abstractable hydrogen atom typically located on a carbon atom in a position alpha to a nitrogen or an oxygen atom, or carried by terminal or pendant mercapto groups potentially protected during polymerization.

According to one preferred aspect, the co-polymerized hydrogen-donating monomer for use herein is selected from the group of monomers comprising at least one hydrogen atom on a carbon atom in a α-position to a nitrogen atom.

In some aspects, the co-polymerized hydrogen-donating monomer for use herein is selected from the group consisting of (meth)acrylamide, (meth)acrylic, urethane(meth) acrylic, styrenic and vinylic monomers containing at least one amine functional group, preferably a tertiary amine functional group, and any combinations or mixtures thereof.

In another particular aspect of the radiation crosslinkable pressure sensitive adhesive precursor of the invention, the co-polymerized hydrogen-donating monomer is selected from the group consisting of N,N-dimethyl acrylamide; N-vinyl caprolactam; N-Vinylpyrrolidone; N-isopropyl acrylamide; N,N-dimethylamino ethyl methacrylate; 2-[[Butylamino)carbonyl]oxy]ethyl acrylate N,N-dimethylaminopropyl methacrylamide; N,N-diethylaminopropyl methacrylamide; N,N-dimethylaminoethyl acrylate; N,N-diethylaminoethyl acrylate; N,N-dimethylaminopropyl acrylate; N,N-diethylaminopropyl acrylate; N,N-diethylaminoethyl methacrylate; N,N-dimethylaminoethyl acrylamide; N,N-dimethylaminoethyl methacrylamide; N,N-diethylaminoethyl acrylamide; N,N-diethylaminoethyl methacrylamide; and any combinations or mixtures thereof. Preferably still, the co-polymerized hydrogen-donating monomer for use herein is selected from the group consisting of N,N-dimethyl acrylamide; N-vinyl caprolactam; N-isopropyl acrylamide; N,N-dimethylaminoethyl methacrylate; 2-[[(Butylamino)carbonyl]oxy]ethyl acrylate and any combinations or mixtures thereof.

The co-polymerized hydrogen-donating monomer may typically be used in an amount from 0.05 to 10 parts, from 0.05 to 5 parts, from 0.10 to 3 parts, or even from 0.15 to 2 parts by weight per 100 parts by weight of acrylate base polymer (or of pre-polymerization monomer mixture used to prepare the acrylate base polymer).

In one exemplary aspect of the radiation crosslinkable pressure sensitive adhesive precursor of the invention, the co-polymerized hydrogen-donating monomer for use herein may be co-polymerized with the acrylate base polymer, i.e. co-polymerized together with the other monomers present into the pre-polymerization monomer mixture used to prepare the acrylate base polymer.

In an alternative exemplary aspect of the radiation crosslinkable pressure sensitive adhesive precursor of the invention, the co-polymerized hydrogen-donating monomer for use herein may be co-polymerized with a crosslinking polymer, preferably an acrylate crosslinking polymer, i.e. co-polymerized together with the other monomers present into the pre-polymerization monomer mixture used to prepare the crosslinking polymer, as detailed herein below, and wherein the crosslinking polymer is distinct from the acrylate base polymer.

The radiation crosslinkable pressure sensitive adhesive precursor according to the present invention, further comprises a tackifying resin. Suitable tackifying resin for use herein will be easily identified by those skilled in the art, in the light of the present description.

The tackifying resin or resins are added to the radiation crosslinkable pressure sensitive adhesive precursor at levels to give what are called in this disclosure a "highly tackified pressure sensitive adhesive" (typically greater than 40 parts by weight tackifying resin per 100 parts by weight of acrylate base polymer).

Typically, (meth)acrylate based adhesives require little or no tackifying resins to achieve desired pressure sensitive adhesive properties. The use of high levels of tackifying agent(s) may be desirable because it can increase the tackiness of the pressure sensitive adhesive, making it aggressively adhere to wide range of substrates without the need to apply pressure. The addition of tackifying resin, especially high levels of tackifying resin, can detrimentally affect the shear and cohesive strength of a pressure sensitive adhesive, and can raise the Tg of the adhesive. The use of high levels of tackifying resin can be particularly detrimental to hot melt processable pressure sensitive adhesives where the need to be hot melt processable can already adversely affect the shear strength and cohesive strength properties of the adhesive. However, the adhesives of the present disclosure comprise greater than 40 parts by weight of tackifying resin per 100 parts by weight of acrylate base polymer. This relatively high level of tackifying resin is achieved without significant negative effects on the shear properties of the adhesive.

In some particular aspects, the amount of tackifying resin present in the radiation crosslinkable pressure sensitive adhesive precursor is greater than 45 parts, greater than 50 parts, greater than 55 parts, or even greater than 60 parts by weight per 100 parts by weight of acrylate base polymer. In some other aspects, the radiation crosslinkable pressure sensitive adhesive precursor comprises from 45 to 85 parts, from 45 to 75 parts, from 45 to 65 parts, or even from 50 to 60 parts by weight of tackifying resin per 100 parts by weight of acrylate base polymer.

Suitable tackifying resins include, for example, terpene phenolics, rosins, rosin esters, esters of hydrogenated rosins, synthetic hydrocarbon resins and combinations thereof. Especially suitable tackifying resins include the commercially available tackifying resins: FORAL 85E (a glycerol ester of highly hydrogenated refined gum rosin) commercially available from Eastman, Middelburg, NL), FORAL 3085 (a glycerol ester of highly hydrogenated refined wood rosin) commercially available from Hercules Inc., Wilmington, Del.; ESCOREZ 2520 and ESCOREZ 5615 (aliphatic/aromatic hydrocarbon resins) commercially available from ExxonMobil Corp., Houston, Tex.; and Regalite 7100 (a partially hydrogenated hydrocarbon resin) commercially available from Eastman, Kingsport, Tenn.

In some aspects, it may be desirable to use a mixture of two tackifying resins, where one of the tackifying resins comprises a high Tg tackifying resin with a glass transition temperature of at least 20° C., and the other comprises a low Tg tackifying resin with a glass transition temperature of no greater than 0° C. Such mixtures of tackifying resins are described, for example, in PCT Patent Publication No. WO 2010/002557 (Ma et al.). The high Tg tackifying resin is typically a solid at room temperature. Examples of suitable high Tg tackifying resin include, for example, terpenes, aliphatic- or aromatic-modified C5 to C9 hydrocarbons, and rosin esters. In some aspects, lower molecular weight hydrocarbons may be preferred, as compatibility with the acrylate base polymer decreases as the molecular weight of the hydrocarbon increases. In some aspects, the weight average molecular weight (Mw) of the high Tg tackifying resin is between 500 and 3000 gm/mole. In some aspects, the Mw of the high Tg tackifying resin is no greater than 1500, in some embodiments no greater than 1000, or even no greater than 800 gm/mole.

The low Tg tackifying resin has a glass transition temperature of no greater than 0° C., in some aspects, no greater than −10° C., or even no greater than −20° C. Such materials are generally liquids at room temperature. There is no particular lower limit on the glass transition temperature of the low Tg tackifying resin, except that it must be greater than the Tg the acrylate base polymer. In some aspects, the Tg of the low Tg tackifying resin is at least 10° C. greater, at least 20° C. greater, or even at least 30° C. greater than the Tg of the acrylate base polymer. Generally, lower molecular weight compounds may be more desirable, as compatibility with the acrylate base polymer decreases as the molecular weight of the increases. Exemplary low Tg tackifying resins include terpene phenolic resins, terpenes, aliphatic- or aromatic-modified C5 to C9 hydrocarbons, and rosin esters. In some aspects, the weight average molecular weight (Mw) of the low Tg tackifying resin is between 300 and 1500 gm/mole. In some aspects, the Mw of the low Tg tackifying resin is no greater than 1000, in some aspects, no greater than 800, or even no greater than 500 gm/mole.

In some aspects, the adhesive precursors comprise from 35 to 65 parts by weight of the high Tg tackifying resin per 100 parts by weight of acrylate base polymer. In some aspects, the adhesive precursors comprise at least 40 parts by weight of the high Tg tackifying resin per 100 parts by weight of acrylate base polymer. In some aspects, the adhesive precursors comprise greater than 50 parts by weight or even at least 60 parts by weight of the high Tg tackifying resin per 100 parts by weight of acrylate base polymer.

In some aspects, the adhesive precursors comprise from 2 to 20 parts by weight of low Tg tackifying resin per 100 parts by weight of acrylate base polymer. In some aspects, the adhesives comprise at least from 5 to 18, or even from 5 to 17 parts by weight of low Tg tackifying resin per 100 parts by weight of acrylate base polymer.

A wide variety of commercially available tackifying resins are available and are suitable for use as the high Tg tackifying resin and the low Tg tackifying resin. Especially suitable High Tg tackifying resins include the commercially available tackifying resins: FORAL 3085 and FORAL 85LB resins commercially available from Hercules Inc., Wilmington, Del.; and SP-553 from Schenectady International, Schenectady, N.Y., with FORAL 3085 being especially desirable. Especially suitable Low Tg tackifying resins include the commercially available tackifying resins: ESCOREZ 2520 commercially available from ExxonMobil Corp., Houston, Tex., STAYBELITE Ester 3-E commercially available from Eastman Chemical, Kingsport, Tenn., PICCOLYTE AO commercially available from Hercules, Inc., Wilimington, Del., and HERCOLYN D commercially available from Hercules, Inc., Wilimington, Del., with ESCOREZ 2520 being especially desirable.

In a preferred aspect of the radiation crosslinkable pressure sensitive adhesive precursor according to the invention, the tackifying resin is selected from the group consisting of terpene phenolics, rosins, rosin esters, esters of hydrogenated rosins, synthetic hydrocarbon resins, and any combinations or mixtures thereof. More preferably, the tackifying resin is selected from the group of esters of hydrogenated rosins.

In some aspects of the present invention, the radiation crosslinkable pressure sensitive adhesive precursor according to the present invention may optionally comprise a crosslinking polymer.

Suitable compositions for forming a crosslinking polymer for use herein will be easily identified by those skilled in the art, in the light of the present disclosure. Exemplary compositions useful for preparing a crosslinking polymer for use herein include, but are not limited to, those comprising a monomer mixture comprising monomers selected from the group consisting of acrylic monomers, vinyl ester monomers, acryl amide monomers, alkyl(meth)acryl amide monomers, dialkyl acryl amide, styrenic monomers, and any combinations or mixtures thereof.

Accordingly, crosslinking polymers for use herein may be acrylate, vinyl ester, acryl amide, alkyl acryl amide, dialkyl acryl amide or styrene (co)polymers, including in particular monomers such as e.g. alkyl(meth)acrylamide monomers, di aryl(meth)acrylamide monomers, styrenic monomers (in particular low Tg styrenic monomers such as e.g. butoxystyrene monomers), vinyl ester monomers, and any combinations or mixtures thereof.

In a preferred aspect, the crosslinking polymer is an acrylate crosslinking polymer. Compositions useful for forming the acrylate crosslinking polymer for use herein may be identical or distinct from the compositions used for forming the acrylate base polymer, as described herein above.

In a preferred aspect, the acrylate crosslinking polymer for use in the present invention, is prepared from a monomer mixture comprising at least one linear or branched alkyl (meth)acrylate monomer, wherein the linear or branched alkyl group of the alkyl(meth)acrylate monomer preferably comprises from 1 to 24, more preferably from 4 to 20, even more preferably 6 to 15, still more preferably from 6 to 10 carbon atoms.

In still a preferred aspect, the linear or branched alkyl (meth)acrylate monomer is selected from the group consisting of methyl acrylate, ethyl acrylate, n-propyl acrylate, isopropyl acrylate, n-butyl acrylate, isobutyl acrylate, n-pentyl acrylate, iso-pentyl acrylate, n-hexyl acrylate, iso-hexyl acrylate, cyclohexyl acrylate, octyl acrylate, iso-octyl acrylate, 2-ethylhexyl acrylate, decyl acrylate, lauryl acrylate, 2-propylheptyl acrylate, stearyl acrylate, isobornyl acrylate, and any combinations or mixtures thereof.

More preferably, the alkyl(meth)acrylate monomer for use herein is selected from the group consisting of iso-octyl acrylate, 2-ethylhexyl acrylate, butyl acrylate, and any combinations or mixtures thereof. Still more preferably, the alkyl(meth)acrylate monomer for use herein comprises (or consists of) iso-octyl acrylate.

According to a particular aspect, a vinyl ester (co)-monomer, preferably a vinyl ester of versatic acid (co)-monomer, may be present in the (pre-polymerization) monomer mixture used to prepare the crosslinking polymer, typically in an amount of from 0 to 50 parts co-monomer, and is thus typically (co)polymerized with the acrylate monomers. Suitable vinyl ester of versatic acid (co)-monomers include the commercially available monomer: Veova 10, commercially available from Momentive, Columbus, Ohio. Typically the vinyl ester co-monomer is used in amounts ranging from 0.5 to 40 parts, from 1.0 to 30 parts, from 5 to 25 parts, from 10 to 20 parts, or even from 15 to 20 parts, by weight per 100 parts by weight of acrylate crosslinking polymer.

In some aspects, the radiation crosslinkable pressure sensitive adhesive precursor mixture comprises from 0.5 to 30 parts, from 0.5 to 20 parts, from 1.0 to 10 parts, or even from 2.0 to 8.0 parts by weight per 100 parts by weight of acrylate base polymer, of the crosslinking polymer, preferably the acrylate crosslinking polymer.

In a particular aspect of the radiation crosslinkable pressure sensitive adhesive precursor of the invention, the co-polymerized type (II) photocrosslinker and/or the co-polymerized hydrogen-donating monomer for use herein may be co-polymerized with the crosslinking polymer, preferably the acrylate crosslinking polymer, i.e. co-polymerized together with the other monomers present into the pre-polymerization monomer mixture used to prepare the crosslinking polymer, preferably the acrylate crosslinking polymer.

Generally, the pre-polymerization monomer mixture used to prepare the crosslinking polymer, includes an appropriate initiator.

For thermal polymerization, a thermal initiator is included. Thermal initiators useful in the present invention include, but are not limited to azo, peroxide, persulfate, and redox initiators. Azo-type initiators, such as e.g. the "Vazo" line, commercially available from DuPont Chemical Co, are particularly preferred. The thermal initiator may be used in an amount from about 0.01 to about 5.0 parts by weight per 100 parts by weight of total monomer, preferably from 0.025 to 2 weight percent.

For polymerization by ultraviolet light, a photoinitiator is included. Useful photoinitiators include those described herein above for use in the acrylate base polymer. The photoinitiator may be used in an amount from about 0.001 to about 5.0 parts by weight per 100 parts of total monomer, from about 0.01 to about 5.0 parts by weight per 100 parts by weight of total monomer, or even from 0.1 to 0.5 parts by weight per 100 parts by weight of total monomer.

Typically, the radiation crosslinkable pressure sensitive adhesive precursor mixture according to the invention may further include, as an optional ingredient, a chain transfer agent to control the molecular weight of the polymer. Advantageously, the chain transfer agent is comprised in the (pre-polymerization) monomer mixture used to prepare the acrylate base polymer and/or the crosslinking polymer. Chain transfer agents are materials which regulate free radical polymerization and are generally known in the art. Suitable chain transfer agents include halogenated hydrocarbons such as carbon tetrabromide; sulfur compounds such as lauryl mercaptan, butyl mercaptan, ethanethiol, isooctylthioglycolate (IOTG), 2-ethylhexyl thioglycolate, 2-ethylhexyl mercaptopropionate, pentaerythritol terakis(3-mercaptopropionate), 2-mercaptoimidazole, and 2-mercaptoethyl ether; and solvents such as ethanol and isopropanol.

As will be apparent to those skilled in the art, the radiation crosslinkable pressure sensitive adhesive precursor mixture according to the invention may further include a variety of additional additives depending on the envisaged properties for the resulting crosslinked pressure sensitive adhesive. Exemplary additional additives include, but are not limited to, one or more plasticizers, UV stabilizers, antistatic agents, colorants, antioxidants, fungicides, bactericides, organic and/or inorganic filler particles, pigments, and any combinations thereof. Advantageously, the additional additives for use herein are non-polymerizable additives. As will be apparent to those skilled in the art, additional additives for use herein may be included at appropriate timing and in the appropriate polymeric or pre-polymeric matrix.

In an advantageous aspect of the radiation crosslinkable pressure sensitive adhesive precursor according to the invention, the amount of acrylate base polymer and co-polymerized hydrogen-donating monomer are selected such as to provide the radiation crosslinked pressure sensitive adhesive obtained by radiation crosslinking, preferably UV radiation crosslinking, the radiation crosslinkable pressure sensitive adhesive precursor, with a static shear at 70° C. of at least 2000 minutes, preferably at least 4000 minutes, more preferably at least 6000 minutes, even more preferably at least 8000 minutes, still more preferably at least 10000 minutes, when measured according to static shear test ASTM D3654.

In an advantageous aspect, the static shear at 70° C. is measured on a UV crosslinked pressure sensitive adhesive layer coated on a substrate, wherein the thickness of the pressure sensitive adhesive layer is typically of about 100 µm, and wherein the UV crosslinking is typically operated with 800 mJ/cm$^2$ UV from a medium pressure UV lamp, corresponding to 250 mJ/cm$^2$ UV-B light and 50 mJ/cm$^2$ UV-C.

According to one preferred aspect of the invention, the radiation crosslinkable pressure sensitive adhesive precursor comprises:
  a) an acrylate base polymer;
  b) from 0.06 to 1 parts, from 0.11 to 1 parts, from 0.16 to 1 parts, from 0.18 to 0.70 parts, or even from 0.20 to 0.50 parts by weight per 100 parts by weight of acrylate base polymer, of a co-polymerized type (II) photocrosslinker;
  c) from 0.05 to 30 parts, from 0.05 to 10 parts, from 0.05 to 5 parts, from 0.10 to 3 parts, or even from 0.15 to 2 parts by weight per 100 parts by weight of acrylate base polymer, of a co-polymerized hydrogen-donating monomer; and
  d) from 40 to 80 parts, from 40 to 60 parts, or even from 45 to 55 parts by weight per 100 parts by weight of acrylate base polymer, of a tackifying resin.

In an advantageous aspect of the invention, the radiation crosslinkable pressure sensitive adhesive precursor is holt melt processable. But the invention is not that limited, as according to another advantageous aspect, the radiation crosslinkable pressure sensitive adhesive precursor may be provided as a solvent borne adhesive system, which is therefore solvent processable, or as a water based system.

Hot melt processable radiation crosslinkable pressure sensitive adhesive precursors for use herein are typically hot melt mixed blends comprising an acrylate base polymer, a co-polymerized type (II) photocrosslinker, in a amount greater than 0.15 parts by weight per 100 parts by weight of acrylate base polymer, a co-polymerized hydrogen-donating monomer, and a tackifying resin, in an amount greater than 40 parts by weight per 100 parts by weight of acrylate base polymer. Typically, the hot melt processable radiation crosslinkable pressure sensitive adhesive precursor may further comprise a thermoplastic material.

The hot melt processable radiation crosslinkable pressure sensitive adhesive precursors for use herein may be prepared by a variety of hot melt techniques. Generally, the methods comprise providing a hot melt mixing apparatus, providing an acrylate base polymer, a co-polymerized type (II) photocrosslinker in a amount greater than 0.15 parts by weight per 100 parts by weight of acrylate base polymer, a co-polymerized hydrogen-donating monomer, and providing greater than 40 parts by weight per 100 parts by weight of acrylate base polymer of a tackifying resin in an amount, mixing the acrylate base polymer, the co-polymerized type (II) photocrosslinker, the co-polymerized hydrogen-donating monomer and the tackifying resin in the hot melt mixing apparatus to prepare a hot melt blend, removing the blend from the hot melt mixing apparatus to form a hot melt processable pressure sensitive adhesive.

As described below, a variety of additional additives can be included in the hot melt blend including one or more plasticizers, crosslinkers, UV stabilizers, antistatic agents, colorants, antioxidants, fungicides, bactericides, organic and/or inorganic filler particles, and the like. Optionally, low levels of plasticizer (e.g., less than about 10 parts by weight) may be added to the hot melt blend. A wide variety of commercially available materials described as "plasticizers"

are suitable, as long as the added plasticizer is compatible with the other components of the hot melt blend. Representative plasticizers include polyoxyethylene aryl ether, dialkyl adipate, 2-ethylhexyl diphenyl phosphate, t-butylphenyl diphenyl phosphate, di(2-ethylhexyl) adipate, toluenesulfonamide, dipropylene glycol dibenzoate, polyethylene glycol dibenzoate, polyoxypropylene aryl ether, dibutoxyethoxyethyl formal, and dibutoxyethoxyethyl adipate. Especially suitable is the plasticizer SANTICIZER 141 (2-ethylhexyl diphenyl phosphate) commercially available from Ferro Corp., Cleveland, Ohio.

A variety of hot melt mixing techniques using a variety of hot melt mixing equipment are suitable for preparing the hot melt processable pressure sensitive adhesive precursors and hot melt processable pressure sensitive adhesives. Both batch and continuous mixing equipment may be used. Examples of batch methods include those using a BRABENDER (e.g. a BRABENDER PREP CENTER, commercially available from C.W. Brabender Instruments, Inc.; South Hackensack, N.J.) or BANBURY internal mixing and roll milling equipment (e.g. equipment available from Farrel Co.; Ansonia, Conn.). Examples of continuous methods include single screw extruding, twin screw extruding, disk extruding, reciprocating single screw extruding, pin barrel single screw extruding, planetary extruding, and ring extruding. Continuous methods can utilize distributive elements, pin mixing elements, static mixing elements, and dispersive elements such as MADDOCK mixing elements and SAXTON mixing elements. A single hot melt mixing apparatus may be used, or a combination of hot melt mixing equipment may be used to prepare the hot melt blends and the hot melt processable pressure sensitive adhesives. In some embodiments, it may be desirable to use more than one piece of hot melt mixing equipment. For example, one extruder, such as, for example, a single screw extruder, can be used to hot melt process the hot melt processable elastomeric (meth)acrylate random copolymer contained within a thermoplastic pouch. The output of this extruder can be fed into a second extruder, for example, a twin screw extruder for hot melt mixing with the additional components. The hot melt blends described above are used to form hot melt processable pressure sensitive adhesives upon completion of the hot melt blending process.

The output of the hot melt mixing is coated onto a substrate to form an adhesive layer. If a batch apparatus is used, the hot melt blend can be removed from the apparatus and placed in a hot melt coater or extruder and coated onto a substrate. If an extruder is used to prepare the hot melt blend, the blend can be directly extruded onto a substrate to form an adhesive layer in a continuous forming method. In the continuous forming method, the adhesive can be drawn out of a film die and subsequently contacted to a moving plastic web or other suitable substrate. If the adhesive is to be part of a tape, the substrate may be a tape backing. In some methods, the tape backing material is coextruded with the adhesive from a film die and the multilayer construction is then cooled to form the tape in a single coating step. If the adhesive is to be a transfer tape, the adhesive layer may be a free standing film and the substrate may be a release liner or other releasing substrate. After forming, the adhesive layer or film can be solidified by quenching using both direct methods (e.g. chill rolls or water batch) and indirect methods (e.g. air or gas impingement).

In alternative aspects of the invention however, the radiation crosslinkable pressure sensitive adhesive precursor may be coated using any other conventional technique well-known in the art, such as e.g. solution coating, emulsion coating, extrusion coating, coextrusion coating, solventless coating, waterborne coating, and any combinations thereof.

The resulting radiation crosslinkable pressure sensitive adhesive precursor layer is then subjected to a crosslinking step by being exposed to suitable radiation, in particular to high intensity UV radiation, to effect crosslinking. Typically, the crosslinking step is performed by exposure to high intensity ultraviolet (UV) radiation using commonly known UV lamps with an emission spectra between 250 to 400 nanometers (nm), and with an intensity between about 0.1 to about 1000 mW/cm$^2$.

According to another aspect, the present invention relates to a method of preparing a radiation crosslinked pressure sensitive adhesive, comprising the steps of:
  a) providing a radiation crosslinkable pressure sensitive adhesive precursor as above-described; and
  b) radiation crosslinking the radiation crosslinkable pressure sensitive adhesive precursor.

The radiation crosslinkable pressure sensitive adhesive precursor according to the invention may be obtained using techniques commonly known to those skilled in the art of formulating pressure sensitive adhesive formulations. The polymeric precursor may be obtained in a conventional manner, using e.g. solution, bulk, or emulsion polymerization techniques. The acrylate base polymer may advantageously be obtained using bulk or solution polymerization using thermal or UV techniques. The crosslinking polymer may advantageously be obtained using solution polymerization, followed by stripping of the solvent thereby forming a polymelt.

Depending on whether the type (II) photocrosslinker and/or the hydrogen-donating monomer are co-polymerized with the acrylate base polymer and/or with the crosslinking polymer, the various pre-polymerizations formulations and the corresponding monomer mixtures will be easily apparent to those skilled in the art in the light of the present description.

Typically, the polymerization steps for the acrylate base polymer are effected by exposure to ultraviolet (UV) radiation as described in U.S. Pat. No. 4,181,752 (Martens et al.). In some executions, the polymerization is carried out with UV black lights having over 60 percent, or over 75 percent of their emission spectra between 280 to 400 nanometers (nm), with an intensity between about 0.1 to about 25 mW/cm2.

The weight average molecular weight of the polymer (i.e. the acrylate base polymer and/or the crosslinking polymer) having a co-polymerized type (II) photocrosslinker may advantageously range from about 50,000 to about 3,000,000, or from about 100,000 to about 1,800,000, and more typically from about 200,000 to about 1,500,000.

In one advantageous aspect, the method of preparing a radiation crosslinked pressure sensitive adhesive, comprises the steps of:
  a) providing a radiation crosslinkable pressure sensitive adhesive precursor as above-described; and
  b) radiation crosslinking the radiation crosslinkable pressure sensitive adhesive precursor.

According to one exemplary aspect, the method of preparing a radiation crosslinked pressure sensitive adhesive comprises the steps of:
  a) providing an acrylate base polymer;
  b) providing a co-polymerized type (II) photocrosslinker, in a amount greater than 0.05 parts, greater than 0.10 parts, or even greater than 0.15 parts by weight per 100 parts by weight of acrylate base polymer;

c) providing a co-polymerized hydrogen-donating monomer;

d) providing a tackifying resin, in an amount greater than 40 parts by weight per 100 parts by weight of acrylate base polymer;

e) mixing the acrylate base polymer, co-polymerized type (II) photocrosslinker, the co-polymerized hydrogen-donating monomer and the tackifying resin thereby forming a radiation crosslinkable pressure sensitive adhesive precursor; and f) radiation crosslinking, preferably UV radiation crosslinking, the radiation crosslinkable pressure sensitive adhesive precursor thereby forming a radiation crosslinked pressure sensitive adhesive.

In one particular aspect of the method of preparing a radiation crosslinked pressure sensitive adhesive, the co-polymerized type (II) photocrosslinker and/or the co-polymerized hydrogen-donating monomer are co-polymerized with the acrylate base polymer and/or with a crosslinking polymer, preferably an acrylate crosslinking polymer, distinct from the acrylate base polymer.

In another particular aspect of the method of preparing a radiation crosslinked pressure sensitive adhesive, the co-polymerized type (II) photocrosslinker and/or the co-polymerized hydrogen-donating monomer are co-polymerized with the acrylate base polymer.

In still another particular aspect of the method of preparing a radiation crosslinked pressure sensitive adhesive, the co-polymerized type (II) photocrosslinker and/or the co-polymerized hydrogen-donating monomer are co-polymerized with the crosslinking polymer, preferably the acrylate crosslinking polymer.

In a preferred execution of the method of preparing a radiation crosslinked pressure sensitive adhesive, the amount of acrylate base polymer and co-polymerized hydrogen-donating monomer are selected such as to provide the radiation crosslinked pressure sensitive adhesive obtained by radiation crosslinking, preferably UV radiation crosslinking, the radiation crosslinkable pressure sensitive adhesive precursor, with a static shear at 70° C. of at least 2000 minutes, preferably at least 4000 minutes, more preferably at least 6000 minutes, even more preferably at least 8000 minutes, still more preferably at least 10000 minutes, when measured according to static shear test ASTM D3654.

In an advantageous aspect of the method of preparing a radiation crosslinked pressure sensitive adhesive, the static shear at 70° C. is measured on a UV crosslinked pressure sensitive adhesive layer coated on a substrate, wherein the thickness of the pressure sensitive adhesive layer is typically of about 100 µm, and wherein the UV crosslinking is typically operated with 250 mJ/cm² UV-B light.

Advantageously, the method of preparing a radiation crosslinked pressure sensitive adhesive comprises the step of melt mixing the acrylate base polymer, the co-polymerized type (II) photocrosslinker, the co-polymerized hydrogen-donating monomer and the tackifying resin thereby forming a hot melt processable radiation crosslinkable pressure sensitive adhesive precursor.

According to another aspect of the present invention, it is provided a radiation crosslinked pressure sensitive adhesive obtainable by radiation crosslinking the radiation crosslinkable pressure sensitive adhesive precursor precursor as above described.

In another aspect, it is provided a radiation crosslinked pressure sensitive adhesive, as above described, coated on a substrate, wherein the radiation crosslinked pressure sensitive adhesive coating has preferably a thickness of at least 40 µm, or greater than 50 µm, greater than 70 µm, greater than 80 µm, greater than 90 µm, or even greater than 100 µm.

Advantageously, the radiation crosslinked pressure sensitive adhesive as above described is hot melt processable.

The radiation crosslinked pressure sensitive adhesives and radiation crosslinked pressure sensitive adhesive precursors of the invention, in particular the hot melt and solution processable adhesives and precursors, may advantageously be used to prepare a wide range of adhesive tapes and articles. Many of these tapes and articles contain backings or other substrates to support the layer of adhesive. Other adhesive tapes and articles do not contain a backing or substrate layer and therefore are free standing adhesive layers. Double-sided tapes are an example of such an adhesive article. Double-sided tapes, also called "transfer tapes", are adhesive tapes that have adhesive on both exposed surfaces. In some transfer tapes, the exposed surfaces are simply the two surfaces of a single adhesive layer. Other transfer tapes are multi-layer transfer tapes with at least two adhesive layers that may be the same or different, and in some instances intervening layers that may not be adhesive layers. For example, a multi-layer transfer tape may be a 3 layer construction with an adhesive layer, a film layer and another adhesive layer. The film layer can provide handling and/or tear strength or other desirable properties. In this disclosure, double-sided adhesives are prepared that comprise one free standing layer of pressure sensitive adhesive.

Since the double-sided adhesives are free standing, they must have sufficient handling strength to be handled without the presence of a supporting layer. However, in many aspects it is desirable that the adhesive layer be readily tearable, that is to say that the adhesive layer can be readily torn by hand without requiring the use of a cutting implement such as a knife, scissors, or a razor blade.

Advantageously, the methods described in this disclosure may be used to form a variety of adhesive articles. Among these adhesive articles are tapes, including transfer tapes. As described above, transfer tapes may be free standing adhesive films with adhesive on both exposed surfaces. Transfer tapes are widely used in the printing and paper making industries for making flying splices, as well being used for a variety of bonding, mounting, and matting applications both by industry and by consumers.

Transfer tapes can be prepared in particular by hot melt coating the hot melt blends described above onto a release surface such as a release liner. "Release liners" are well known film articles that have a low affinity for adhesives, especially pressure sensitive adhesives. A wide variety of release liners are known and are suitable for use with the pressure sensitive adhesives of this disclosure. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like). At least some release liners are coated with a layer of a release agent such as a silicone-containing material or a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film. The liner can have a microstructure on its surface that is imparted to the adhesive to form a microstructure on the surface of the adhesive layer. The liner can then be removed to expose an adhesive layer having a microstructured surface.

In many transfer tape embodiments, it is desirable that the transfer tape be hand tearable, that is to say that the dispensed adhesive can be torn by hand without the need for cutting of the transfer tape. This is particularly true when the transfer tape is dispensed from a bladeless hand held dispenser, such as the SCOTCH ATG dispensers commercially available from 3M Company, St. Paul, Minn. The pressure sensitive adhesives of the present disclosure not only have the handling strength required of transfer tape, but also are typically hand tearable.

Accordingly, and in another aspect, the present invention relates to the use of a radiation crosslinkable pressure sensitive adhesive precursor as above described, for the manufacture of an adhesive tape, preferably a double-sided tape.

Item 1 is a radiation crosslinkable pressure sensitive adhesive precursor comprising:
- a) an acrylate base polymer;
- b) a co-polymerized type (II) photocrosslinker, in a amount greater than 0.05 parts by weight per 100 parts by weight of acrylate base polymer;
- c) a co-polymerized hydrogen-donating monomer; and
- d) a tackifying resin, in an amount greater than 40 parts by weight per 100 parts by weight of acrylate base polymer.

Item 2 is the precursor of item 1, wherein the amount of co-polymerized type (II) photocrosslinker is in amount greater than 0.10 parts, or greater than 0.15 parts by weight per 100 parts by weight of acrylate base polymer.

Item 3 is a precursor according to any of item 1 or 2, wherein the amount of acrylate base polymer and co-polymerized hydrogen-donating monomer are selected such as to provide the radiation crosslinked pressure sensitive adhesive obtained by radiation crosslinking, preferably UV radiation crosslinking, the radiation crosslinkable pressure sensitive adhesive precursor, with a static shear at 70° C. of at least 2000 minutes, preferably at least 4000 minutes, more preferably at least 6000 minutes, even more preferably at least 8000 minutes, still more preferably at least 10000 minutes, when measured according to static shear test ASTM D3654.

Item 4 is a precursor according to item 3, wherein the static shear at 70° C. is measured on a UV crosslinked pressure sensitive adhesive layer coated on a substrate, wherein the thickness of the pressure sensitive adhesive layer is typically of about 100 μm, and wherein the UV crosslinking is typically operated with 250 mJ/cm$^2$ UV-B light.

Item 5 is a precursor according to any of the preceding items, wherein the amount of tackifying resin is greater than 45, preferably greater than 50, more preferably greater than 55, even more preferably greater than 60 parts by weight per 100 parts by weight of acrylate base polymer.

Item 6 is a precursor according to any of the preceding items, which comprises:
- a) an acrylate base polymer;
- b) from 0.06 to 1 parts, from 0.11 to 1 parts, from 0.16 to 1 parts, from 0.18 to 0.70 parts, or even from 0.20 to 0.50 parts by weight per 100 parts by weight of acrylate base polymer, of a co-polymerized type (II) photocrosslinker;
- c) from 0.05 to 30 parts, from 0.05 to 10 parts, from 0.05 to 5 parts, from 0.10 to 3 parts, or even from 0.15 to 2 parts by weight per 100 parts by weight of acrylate base polymer, of a co-polymerized hydrogen-donating monomer; and
- d) from 40 to 80 parts, from 40 to 60 parts, or even from 50 to 60 parts by weight per 100 parts by weight of acrylate base polymer, of a tackifying resin.

Item 7 is a precursor according to any of the preceding items, which comprises:
- a) from 45 to 80 wt %, from 45 to 75 wt %, from 50 to 70 wt %, or even from 60 to 70 wt % by weight of the precursor, of an acrylate base polymer;
- b) from 0.01 to 1 wt %, from 0.03 to 1 wt %, from 0.05 to 1 wt %, from 0.10 to 0.60 wt %, or even from 0.12 to 0.25 wt % by weight of the precursor, of a co-polymerized type (II) photocrosslinker;
- c) from 0.02 to 17 wt %, from 0.02 to 10 wt %, from 0.02 to 4 wt %, from 0.05 to 2 wt %, or even from 0.08 to 1.5 wt % by weight of the precursor, of a co-polymerized hydrogen-donating monomer; and
- d) from 20 to 50 wt %, from 20 to 45 wt %, or even from 25 to 40 wt % by weight of the precursor, of a tackifying resin.

Item 8 is a precursor according to any of the preceding items, wherein the acrylate base polymer is obtained from a polymerizable mixture comprising at least one linear or branched alkyl(meth)acrylate monomer, wherein the linear or branched alkyl group of the alkyl(meth)acrylate monomer preferably comprises from 1 to 24, more preferably from 4 to 20, even more preferably 6 to 15, still more preferably from 6 to 10 carbon atoms.

Item 9 is a precursor according to item 8, wherein the linear or branched alkyl(meth)acrylate monomer is selected from the group consisting of methyl acrylate, ethyl acrylate, n-propyl acrylate, isopropyl acrylate, n-butyl acrylate, isobutyl acrylate, n-pentyl acrylate, iso-pentyl acrylate, n-hexyl acrylate, iso-hexyl acrylate, cyclohexyl acrylate, octyl acrylate, iso-octyl acrylate, 2-ethylhexyl acrylate, decyl acrylate, lauryl acrylate, 2-propylheptyl acrylate, stearyl acrylate, isobornyl acrylate, and any combinations or mixtures thereof.

Item 10 is a precursor according to any of item 8 or 9, wherein the alkyl(meth)acrylate monomer is selected from the group consisting of iso-octyl acrylate, 2-ethylhexyl acrylate, butyl acrylate, and any combinations or mixtures thereof.

Item 11 is a precursor according to any of the preceding items, wherein the acrylate base polymer comprises a co-polymer of at least one alkyl(meth)acrylate monomer which as a homopolymer has a Tg of less than 20° C. and a co-monomer which as a homopolymer has a Tg of greater than 20° C., and wherein the co-monomer which as a homopolymer has a Tg of greater than 20° C. is preferably selected to comprise acrylic acid.

Item 12 is a precursor according to any of the preceding items, wherein the acrylate base polymer comprises a further co-polymerized photocrosslinker, preferably a co-polymerized type (II) photocrosslinker.

Item 13 is a precursor according to any of the preceding items, wherein the acrylate base polymer comprises a co-polymer of iso-octyl acrylate, 2-ethylhexyl acrylate, or butyl acrylate and acrylic acid.

Item 14 is a precursor according to any of the preceding items, wherein the co-polymerized type (II) photocrosslinker is selected from the group of mono-ethylenically unsaturated aromatic ketones, and is preferably selected from the group consisting of para-acryloxybenzophenone (ABP), para-acryloxyethoxybenzophenone (AEBP), para-N-(methylacryloxyethyl)-carbamoylethoxybenzophenone, 4-acryloyloxydiethoxy-4-chlorobenzophenone, para-acryloxyacetophenone, ortho-acrylamidoacetophenone, acrylated anthraquinones, and any combinations or mixtures thereof.

Item 15 is a precursor according to any of the preceding items, wherein the co-polymerized type (II) photocrosslinker is selected from the group of para-acryloxybenzophenone (ABP), para-acryloxyethoxybenzophenone (AEBP), and any combinations or mixtures thereof.

Item 16 is a precursor according to any of the preceding items, wherein the co-polymerized hydrogen-donating monomer is selected from the group of monomers comprising at least one hydrogen atom on a carbon atom in a α-position to a nitrogen, oxygen or sulfur atom. More preferably, the co-polymerized hydrogen-donating monomer is selected from the group consisting of (meth)acrylamide, (meth)acrylic, urethane(meth)acrylic, styrenic, and vinylic monomers containing at least one amine functional group, preferably a tertiary amine functional group.

Item 17 is a precursor according to any of the preceding items, wherein the co-polymerized hydrogen-donating monomer is selected from the group consisting of N,N-dimethyl acrylamide; N-vinyl caprolactam; N-Vinyl pyrrolidone; N-isopropyl acrylamide; N,N-dimethylaminoethyl methacrylate; 2-[[Butylamino)carbonyl]oxy]ethyl acrylate N,N-dimethylaminopropyl methacrylamide; N,N-diethylaminopropyl methacrylamide; N,N-dimethylaminoethyl acrylate; N,N-diethylaminoethyl acrylate; N,N-dimethylaminopropyl acrylate; N,N-diethylaminopropyl acrylate; N,N-diethylaminoethyl methacrylate; N,N-dimethylaminoethyl acrylamide; N,N-dimethylaminoethyl methacrylamide; N,N-diethylaminoethyl acrylamide; N,N-diethylaminoethyl methacrylamide; and any combinations or mixtures thereof.

Item 18 is a precursor according to any of the preceding items, wherein the co-polymerized hydrogen-donating monomer is selected from the group consisting of N,N-dimethyl acrylamide; N-vinyl caprolactam; N-isopropyl acrylamide; N,N-dimethylamino ethyl methacrylate; 2-[[(Butylamino)carbonyl]oxy]ethyl acrylate and any combinations or mixtures thereof.

Item 19 is a precursor according to any of the preceding items, wherein the co-polymerized type (II) photocrosslinker is co-polymerized with the acrylate base polymer.

Item 20 is a precursor according to any of the preceding items, wherein the co-polymerized type (II) photocrosslinker is co-polymerized with a crosslinking polymer distinct from the acrylate base polymer.

Item 21 is a precursor according to any of the preceding items, wherein the co-polymerized hydrogen-donating monomer is co-polymerized with the acrylate base polymer.

Item 22 is a precursor according to any of the preceding items, wherein the co-polymerized hydrogen-donating monomer is co-polymerized with a crosslinking polymer distinct from the acrylate base polymer.

Item 23 is a precursor according to any of the preceding items, wherein the co-polymerized type (II) photocrosslinker and the co-polymerized hydrogen-donating monomer are co-polymerized with the acrylate base polymer.

Item 24 is a precursor according to any of the preceding items, wherein the co-polymerized type (II) photocrosslinker and the co-polymerized hydrogen-donating monomer are co-polymerized with a crosslinking polymer distinct from the acrylate base polymer.

Item 25 is a precursor according to any of items 20 to 24, wherein the crosslinking polymer is an acrylate crosslinking polymer.

Item 25 is a precursor according to any of items 20 to 24, wherein the crosslinking polymer is obtained from polymerizable mixture comprising at least one linear or branched alkyl(meth)acrylate monomer, wherein the linear or branched alkyl group of the alkyl(meth)acrylate monomer preferably comprises from 1 to 24, more preferably from 4 to 20, even more preferably 6 to 15, still more preferably from 6 to 10 carbon atoms.

Item 26 is a precursor according to item 25, wherein the linear or branched alkyl(meth)acrylate monomer is selected from the group consisting of methyl acrylate, ethyl acrylate, n-propyl acrylate, isopropyl acrylate, n-butyl acrylate, isobutyl acrylate, n-pentyl acrylate, iso-pentyl acrylate, n-hexyl acrylate, iso-hexyl acrylate, cyclohexyl acrylate, octyl acrylate, iso-octyl acrylate, 2-ethylhexyl acrylate, decyl acrylate, lauryl acrylate, 2-propylheptyl acrylate, stearyl acrylate, isobornyl acrylate, and any combinations or mixtures thereof.

Item 27 is a precursor according to any of items 20 to 26, wherein the crosslinking polymer is obtained from a polymerizable mixture comprising monomers selected from the group consisting of acrylic monomers, vinyl ester monomers, acryl amide monomers, alkyl(meth)acryl amide monomers, dialkyl acryl amide, styrenic monomers, and any combinations or mixtures thereof.

Item 28 is a precursor according to any of items 20 to 27, wherein the crosslinking polymer is obtained from a polymerizable mixture which is free of acidic monomers, preferably free of acrylic acid monomers.

Item 29 is a precursor according to any of the preceding items, wherein the tackifying resin is selected from the group consisting of terpene phenolics, rosins, rosin esters, esters of hydrogenated rosins, synthetic hydrocarbon resins, and any combinations or mixtures thereof.

Item 30 is a precursor according to any of the preceding items, wherein the tackifying resin is selected from the group of esters of hydrogenated rosins.

Item 31 is a precursor according to any of the preceding items, which is holt melt processable.

Item 32 is a radiation crosslinked pressure sensitive adhesive obtainable by radiation crosslinking the precursor according to any of items 1 to 31.

Item 33 is a radiation crosslinked pressure sensitive adhesive according to item 32 coated on a substrate thereby forming a crosslinked pressure sensitive adhesive layer, wherein the radiation crosslinked pressure sensitive adhesive layer preferably has a thickness of at least 40 μm, or greater than 50 μm, greater than 70 μm, greater than 80 μm, greater than 90 μm, or even greater than 100 μm.

Item 34 is a radiation crosslinked pressure sensitive adhesive according to any of item 32 or 33 which is hot melt processable.

Item 35 is a method of preparing a radiation crosslinked pressure sensitive adhesive, comprising the steps of:
  a) providing a radiation crosslinkable pressure sensitive adhesive precursor according to any of items 1 to 31; and
  b) radiation crosslinking the radiation crosslinkable pressure sensitive adhesive precursor.

Item 36 is the method of item 35, comprising the steps of:
  a) providing an acrylate base polymer;
  b) providing a co-polymerized type (II) photocrosslinker, in a amount greater than 0.05, typically greater than 0.10, more typically greater than 0.15 parts by weight per 100 parts by weight of acrylate base polymer;
  c) providing a co-polymerized hydrogen-donating monomer;

d) providing a tackifying resin, in an amount greater than 40 parts by weight per 100 parts by weight of acrylate base polymer;

e) mixing the acrylate base polymer, the co-polymerized type (II) photocrosslinker, the co-polymerized hydrogen-donating monomer and the tackifying resin thereby forming a radiation crosslinkable pressure sensitive adhesive precursor; and f) radiation crosslinking, preferably UV radiation crosslinking, the radiation crosslinkable pressure sensitive adhesive precursor thereby forming a radiation crosslinked pressure sensitive adhesive.

Item 37 is a method according to any of items 35 or 36, wherein the co-polymerized type (II) photocrosslinker is co-polymerized with the acrylate base polymer.

Item 38 is a method according to any of items 35 to 37, wherein the co-polymerized type (II) photocrosslinker is co-polymerized with a crosslinking polymer distinct from the acrylate base polymer.

Item 39 is a method according to any of items 35 to 38, wherein the co-polymerized hydrogen-donating monomer is co-polymerized with the acrylate base polymer.

Item 40 is a method according to any of items 35 to 39, wherein the co-polymerized hydrogen-donating monomer is co-polymerized with a crosslinking polymer distinct from the acrylate base polymer.

Item 41 is a method according to any of items 35 to 40, wherein the co-polymerized type (II) photocrosslinker and the co-polymerized hydrogen-donating monomer are co-polymerized with the acrylate base polymer.

Item 42 is a method according to any of items 35 to 41, wherein the co-polymerized type (II) photocrosslinker and the co-polymerized hydrogen-donating monomer are co-polymerized with a crosslinking polymer distinct from the acrylate base polymer.

Item 43 is a method according to any of items 37 to 42, wherein the crosslinking polymer is an acrylate crosslinking polymer.

Item 44 is a method according to any of items 35 to 43, wherein the amount of acrylate base polymer and co-polymerized hydrogen-donating monomer are selected such as to provide the radiation crosslinked pressure sensitive adhesive obtained by radiation crosslinking, preferably UV radiation crosslinking, the radiation crosslinkable pressure sensitive adhesive precursor, with a static shear at 70° C. of at least 2000 minutes, preferably at least 4000 minutes, more preferably at least 6000 minutes, even more preferably at least 8000 minutes, still more preferably at least 10000 minutes, when measured according to static shear test ASTM D3654.

Item 45 is the method of item 44, wherein the static shear at 70° C. is measured on a UV crosslinked pressure sensitive adhesive layer coated on a substrate, wherein the thickness of the pressure sensitive adhesive layer is of about 100 µm, and wherein the UV crosslinking is typically operated with 250 mJ/cm$^2$ UV-B light.

Item 46 is a method according to any of items 35 to 45, comprising the step of melt mixing the acrylate base polymer, the co-polymerized type (II) photocrosslinker, the co-polymerized hydrogen-donating monomer and the tackifying resin thereby forming a hot melt processable radiation crosslinkable pressure sensitive adhesive precursor.

Item 47 is the use of a radiation crosslinkable pressure sensitive adhesive precursor according to any of items 1 to 31 for the manufacture of an adhesive tape, preferably a double-sided tape.

EXAMPLES

The invention is further illustrated by the following examples. These examples are merely for illustrative purposes only and are not meant to be limiting on the scope of the appended claims.

Test Methods

1. Static Shear According to ASTM D 3564 (Procedure A) Shear Strength on Stainless Steel (SS):

This test method determines the ability of pressure-sensitive adhesive tapes to remain adhered under constant load applied parallel to the surface of the tape and substrate.

Prior to testing all samples are conditioned at ambient conditions (23° C.+/−2° C. and 50%+/−5% relative humidity).

The shear strength is determined following ASTM Designation: D 3654/D 3654M-06.

First 1 inch (2.54 cm) wide strip of adhesive is cut from the tape by using a specimen cutter holding two single-edge razor blades in parallel planes, the blades spaced 1 inch (2.54 cm) apart. The adhesive strip is then placed onto a clean, stainless steel panel with bright annealed finish in accordance with Specification ASTM A666 having a dimension of 50 mm by 125 mm (and a minimum thickness of 1.1 mm), covering a 1 inch by 1 inch (2.54 cm×2.54 cm) area of the stainless steel panel. The adhesive strip is then over-rolled twice in each direction using a hand-held rubber-covered 2 kg hand-roller at a approximate rate of 10 mm+/−0.4 mm/s A 500 gram weight is then used as the static load, and the test samples are placed on an automated timing apparatus in a air circulated oven at 70° C. The mode of failure for all samples is cohesive failure. The data is reported as an average of three measurements.

2. 180° Peel Adhesion According to ASTM Designation: D3330/D330M-04

This test method covers the measurement of the peel adhesion of pressure-sensitive adhesive tapes. Peel adhesion is measured against stainless steel and PE covered aluminum panels as test substrates. The stainless steel panels have the following dimensions: 50 mm by 125 mm and a minimum thickness of 1.1 mm. The PE covered aluminum panels have a dimension of 50 mm by 150 mm and a thickness of 2 mm. In case of the stainless steel panels, the panels need to conform to Type 302 or 304 of Specification ASTM A 666, having a bright annealed finish. The PE covered aluminum panels are made by selecting a 13 mils thick (330 micrometers) polyethylene film with similar dimensions as the aluminum panel, the PE film made from polyethylene (PE) pellets being available under trade designation "VORIDIAN POLYETHYLENE 1550P" from Eastman Chemical Co. (Kingsport, Tenn., USA), and fixing the PE film with an adhesive film to the aluminum plate. Test surface of the PE selected is the rougher surface side. Prior to testing all samples are conditioned at ambient conditions (23° C.+/−2° C. and 50%+/−5% relative humidity).

In a climate room set at ambient conditions (23° C.+/−2° C. and 50%+/−5% relative humidity), 1 by 1 inch (2.54 cm) wide adhesive strips having a length of approximately 300 mm are cut from the conditioned samples using a specimen cutter holding two single-edged razor blades in parallel planes of the adhesive. The strip is then placed without pressure onto either a cleaned, stainless steel panel or a PE panel. Cleaning of the stainless steel panels is done by wiping the panels with a lint free tissue first with a pass of methyl ethyl ketone (MEK), followed by a wipe with n-heptane and finally another pass with methyl ethyl ketone (MEK). Wiping of the panels per pass of solvent is always done until dryness. The adhesive strips are then laminated onto the substrate using a 2 kg hand-held rubber-covered roller at a rate of 10+/−0.5 mm/s with 2 passes in each direction. After a dwell time of 20 minutes in the climate room, a 180° peel test is performed using a FP-2255 Peel Tester (manufactured by Thwing-Albert Instrument Company), with data collected and averaged over 10 seconds. Three measurements are made per example and the average recorded in N/inch.

LIST OF MATERIALS

| Name | UIPAC Name | Supplier | CAS nr |
|---|---|---|---|
| NNDMA | N,N-Dimethylacrylamide | TCI | 2680-03-7 |
| NVC | Vinylcaprolactam | BASF | 2235-00-9 |
| DMAEMA | N,N-Dimethylaminoethyl methacrylate | Evonik | 220-688-8 |
| EOEA | 2-Ethoxyethyl acrylate | Aldrich | 106-74-1 |
| NiPAm | N-Isopropylacrylamide | Aldrich | 2210-25-5 |
| Ebecryl CL 1039 | 2-[[(Butylamino)carbonyl]oxy]ethyl acrylate | Cytec | 63225-53-6 |
| PPG-Acrylate | Poly(ethylene glycol) acrylate | Aldrich | 9051-31-4 |
| IOA | Isooctyl acrylate | 3M | 29590-42-9 |
| AA | Acrylic acid | BASF | 79-10-7 |
| HEA | Hydroxy ethyl acrylate | DOW | 818-61-1 |
| ABP | 4-Acryloxybenzophenone | 3M | 22535-49-5 |
| AEBP | para-acryloxyethoxybenzophenone | 3M | — |
| V 601 | Dimethyl-2,2'-azobisisobutyrate | Wako Chemicals GmbH | 2589-57-3 |
| Ethyl Acetate | Ethyl Acetate | DOW | 141-78-6 |
| Heptane | Heptane | Exxon | 142-82-5 |
| PETMP | Pentaerythritol tetrakis (3-mercaptopropionate) | Aldrich | 7575-23-7 |
| IOTG | Isooctylthioglycolate | Arkema | 25103-09-7 |
| Irgacure 651 | 2,2-Dimethoxy-1,2-diphenylethan-1-one | Ciba | 24650-42-8 |
| Veova 10 | Vinyl ester of neodecanoic acid | Momentive | 51000-52-3 |
| Foral 85E | a glycerol ester of highly hydrogenated refined gum rosin | Eastman | |

Making of Base Polymers:
Preparation of Base Polymer B0 (Hot Melt Pressure Sensitive Adhesive):

Base polymer B0 has a relatively low molecular weight and its ABP content is chosen in such a way to avoid gelation in the pouches.

A copolymer of IOA and AA is bulk polymerized under UV light sealed in ethylene vinyl acetate film pouches as described in U.S. Pat. No. 6,294,249 (Hamer et al.). Two sheets of 2.5 mil (51 micrometer) thick ethylene vinyl acetate, commercially available as VA-24 from Pliant Corp. of Evansville, Ind., are heat sealed on the lateral edges and the bottom to form a rectangular pouch on a liquid feed, fill, and seal machine. The pouch is filled with a pre-adhesive composition having 96 parts IOA, 4 parts AA, 0.20 phr of Irgacure 651, 0.10 phr ABP and 0.04 IOTG. The filled package is then heat sealed at the top in the cross direction through the monomer to form individual pouches measuring 13.4 cm by 4.3 cm by about 0.4 cm thick containing 25 grams of the pre-adhesive composition. The pouches are placed in a water bath that is maintained between about 16° C. and 32° C. and exposed to ultraviolet radiation (supplied by lamps having about 90 percent of the emissions between 300 and 400 nanometers (nm), and a peak emission at 351 nm) at an intensity of 4.55 mW/cm$^2$ for 21 minutes.

Making of Base Polymers B1-B7:

Further base polymers are produced via solution polymerization. Typically a 45 wt % solution of an acrylate mixture (mostly IOA/AA) in a 85:15 parts solvent mixture of ethyl acetate and heptane is prepared. The polymerization is started by an azo initiator (V 601) and the mixture polymerized under constant stirring for 20 hours at 60° C. Formulations of all used base polymers are provided in Table 1:

TABLE 1

| Base polymer | IOA | AA | NNDMA | HEA | ABP |
|---|---|---|---|---|---|
| B0 | 96 | 4 | | | 0.1 |
| B1 | 96 | 4 | | | 0.2 |
| B2 | 95.8 | 4 | | | 0.2 |
| B3 | 94 | 4 | 2 | | 0.25 |
| B4 | 95.85 | 4 | 0.15 | | 0.25 |
| B5 | 94 | 4 | 2 | | 0 |
| B6 | 96 | | | 4 | 0.1 |
| B7 | 96 | 4 | | | 0.05 |

Making of Polymeric Crosslinkers XL0-XL 14

The crosslinking polymers used for the examples are produced in solution and for the later described hot melt experiments a so-called polymelt is created by stripping the solvent. Typically a 50 wt % solution of an acrylate mixture in ethyl acetateis prepared. The molecular weight is controlled by adding as chain transfer agent pentaerythritol tetrakis(3-mercaptopropionate) (PETMP). The polymerization is started by an azo initiator (Vazo 601) and polymerization takes place under constant stirring for 20 hours at 65° C. Table 2 shows an overview of all crosslinking polymers used for the examples.

TABLE 2

| Crosslinking polymer | IOA | Veova | HDM(*) | Amount | AEBP |
|---|---|---|---|---|---|
| XL0 | 72.5 | 17.5 | NNDMA | 5 | 5 |
| XL1 | 95 | | | | 5 |
| XL2 | 60 | | NNDMA | 40 | |
| XL3 | 90 | | AA | 5 | 5 |
| XL4 | 72.5 | 17.5 | NNDMA | 5 | 5 |
| XL5 | 77.5 | 17.5 | | | 5 |
| XL6 | 71.8 | 17.5 | NiPAm | 5.7 | 5 |
| XL7 | 68 | 20 | NVC | 7 | 5 |
| XL8 | 70.3 | 17.5 | EOEA | 7.2 | 5 |
| XL9 | 72.5 | 17.5 | Ebecryl CL 1039 | 5 | 5 |
| XL10 | 72.5 | 17.5 | PPG Acrylate | 5 | 5 |
| XL11 | 70 | 15 | DMAEMA | 10 | 5 |
| XL12 | 70 | 15 | DMAEMA | 10 | 5 |
| XL13 | 75 | 17.5 | NNDMA | 5 | 2.5 |
| XL14 | 0 | 0 | NNDMA | 97.5 | 2.5 |

(*)Hydrogen-donating monomer

For all examples made from the base polymers and the crosslinking polymers, a hydrogenated rosin ester known as Foral 85E (commercially available from Eastman Chemical Company) is used as tackifier.

Making of Examples Ex 1-Ex 22 (Solution) and HM 1-HM 3 (Hot Melt):

All examples, made from solution or via hot melt processing, are coated to a thickness of 100 mm. For the hot melt examples the base polymer B0 is used and crosslinking polymers XL0 or XL4 in combination with the tackifying resin Foral 85E. Hotmelt compounding is run in a twin screw extruder from Werner & Pfleiderer (Stuttgart, Germany) at 160° C. and a screw speed of 320 rpm. The hot melt coating itself is done using a rotary rod die and the samples are cured offline with 250 mJ/cm$^2$ UV-B light under a medium pressure mercury lamp (available from TCS Technologies). The liner used is a paper liner, siliconized on both sides (available from Mondi Akrosil, Wis., USA), and having a thickness of 75 µm.

Table 3 shows the hot melt processed examples HM 1 through HM 3.

TABLE 3

| HM formulation | Base polymer | Parts | Crosslinker | Parts | Foral E |
|---|---|---|---|---|---|
| HM 1 | B0 | 100 | XL0 | 3.0 | 50 |
| HM 2 | B0 | 100 | XL0 | 6.0 | 50 |
| HM 3 | B0 | 100 | XL4 | 3.0 | 50 |

Examples 1-24 are prepared by blending the components in solution under constant mixing at room temperature (23° C.+/−2° C.) for 60 minutes at 10 rpm/min. The mixtures are then knife coated on a white, double-sided siliconized paper liner (available from Mondi akrosil, USA) having a thickness of 75 µm. Coatings 1-23 have a thickness of 100 µm+/−5 µm and coating 24 has a thickness of 50 µm+/−2 µm. The coatings are irradiated with 250 mJ/cm$^2$ UV-B light under medium pressure mercury lamp (available from TCS Technologies). For testing, the coatings are laminated on 50 µm aluminized PET liner (commercially available as metalized Hostaphan RN from Mitsubishi Polyester Film GmbH, Wiesbaden, Germany) and test specimen are prepared for the static shear and 180° peel measurements as previously described.

Table 4 provides an overview of examples Ex1-Ex24:

| Example No. | Base polymer | Parts | Crosslinking polymer | Parts | Parts of tackifying resin (Foral 85E) |
|---|---|---|---|---|---|
| Ex 1 | B1 | 100 | — | — | 50 |
| Ex 2 | B0 | 100 | XL 1 | 3.0 | 50 |
| Ex 3 | B0 | 100 | XL 4 | 3.0 | 50 |
| Ex 4 | B2 | 100 | XL 2 | 3.0 | 50 |
| Ex 5 | B5 | 100 | XL 3 | 7.5 | 50 |
| Ex 6 | B3 | 100 | — | — | 50 |
| Ex 7 | B4 | 100 | — | — | 50 |
| Ex 8 | B0 | 100 | XL 5 | 3.0 | 50 |
| Ex 9 | B0 | 100 | XL 6 | 3.0 | 50 |
| Ex 10 | B0 | 100 | XL 7 | 3.0 | 50 |
| Ex 11 | B0 | 100 | XL 8 | 7.5 | 50 |
| Ex 12 | B0 | 100 | XL 9 | 7.5 | 50 |
| Ex 13 | B0 | 100 | XL 10 | 7.5 | 50 |
| Ex 14 | B0 | 100 | XL 11 | 3.0 | 50 |
| Ex 15 | B6 | 100 | XL 5 | 3.0 | 50 |
| Ex 16 | B6 | 100 | XL 4 | 3.0 | 50 |
| Ex 17 | B6 | 100 | XL 6 | 3.0 | 50 |
| Ex 18 | B6 | 100 | XL 12 | 3.0 | 50 |
| Ex 19 | B0 | 100 | XL 4 | 3.2 | 60 |
| Ex 20 | B0 | 100 | XL 4 | 4.8 | 60 |
| Ex 21 | B0 | 100 | XL 4 | 6.4 | 60 |
| Ex 22 | B0 | 100 | XL 4 | 16 | 60 |
| Ex 23 | B0 | 100 | XL 14 | 3.0 | 50 |
| Ex 24 | B7 | 100 | XL 13 | 2.8 | 40 |

Test Results

As previously disclosed, the hydrogen donating monomer can be either incorporated into the base polymer or the crosslinking polymer, or into both. The same statement applies for the co-polymerized type (II) photocrosslinkers, which can be co-polymerized into the acrylate base polymer or co-polymerized into a crosslinking polymer, or into both. Table 5 shows the test results of 180° peel adhesion to stainless steel and PE panels as also the static shear values at 70° C. on stainless steel of examples Ex 1-Ex 7. These examples are set-up for showing the effects of the hydrogen donor and the photocrosslinkers depending on if they are part of the base polymer or the crosslinking polymer.

TABLE 5

| Example No | 180° peel to steel (N/inch) | 180° peel to PE (N/inch) | Static shear at 70° C. (min) |
|---|---|---|---|
| Ex 1 | — | — | 247 |
| Ex 2 | — | — | 17 |
| Ex 3 | 23.0 | 14.4 | +10000 |
| Ex 4 | 18.0 | 13.8 | +10000 |
| Ex 5 | 20.6 | 12.9 | +10000 |
| Ex 6 | 23.3 | 15.4 | +10000 |
| Ex 7 | 24.1 | 14.8 | +10000 |
| Ex 23 | 17.2 | 16.8 | +10000 |
| Ex 24 | 16.1 | 17.5 | +10000 |

The results from Table 5 show that formulations Ex 1 and Ex 2, which do not contain any hydrogen donating monomer in the formulation, have a poor shear performance.

Ex 2 and Ex 3 have the same amount of benzophenone in the formulation but in Ex 3, N,N dimethyl acrylamide (NNDMA) is incorporated as a hydrogen donating monomer (HDM) in the crosslinking polymer. A big increase in shear performance can be observed for Ex 3.

Further, Ex 1 and Ex 4 have an equal concentration of benzophenone. In Ex 4, the crosslinking polymer is a IOA/NNDMA copolymer. Adding this high amount of HDM to the mixture generates the same increase in shear performance Ex 5 shows that also the opposite is working. The hydrogen donating monomer is now incorporated in the base polymer and all the benzophenone is located in the crosslinker. Ex 6 and Ex 7 show that the system also works when ABP and the HDM are located in the same base polymer. Ex 23 uses a crosslinker which is poly(N,N Dimethylacrylamide) based. Also, when the total amount of photocrosslinker is reduced as shown in Ex 23 and Ex 24, good shear performance is still obtained.

Upper examples (Ex 3 to Ex 7, as well as Ex 23 and Ex 24) have in common that they use as hydrogen donor NNDMA. Following test results, as provided in Table 6, show the influence of different kinds of hydrogen donors on the shear and 180° peel values.

TABLE 6

| Example No | 180° peel to steel (N/inch) | 180° peel to PE (N/inch) | Static Shear at 70° (min) |
|---|---|---|---|
| Ex 8 | — | — | 3 |
| Ex 9 | 20.9 | 13.7 | +10000 |
| Ex 10 | 21.2 | 15.7 | +10000 |
| Ex 12 | 21.0 | 11.2 | +10000 |
| Ex 14 | 19.6 | 12.9 | +10000 |

In following Table 7, highly tackified PSA systems containing 60 parts Foral 85E are evaluated.

TABLE 7

| Example no | 180° peel to steel (N/inch) | 180° peel to PE (N/inch) | Static Shear at 70° C. (min) |
|---|---|---|---|
| Ex 19 | 25.8 | 13.9 | 9688 |
| Ex 20 | 24.3 | 14.5 | +10000 |
| Ex 21 | 22.7 | 12.3 | +10000 |
| Ex 22 | 20 | 11.7 | +10000 |

In Table 8, the results of the hot melt examples are shown.

TABLE 8

| HM formulation | 180° Peel to steel to stainless steel (N/inch) | 180° peel to PE (N/inch) | Static Shear at 70° C. (min) |
|---|---|---|---|
| HM 1 | 26.0 | 13.8 | 4343 |
| HM 2 | 25.2 | 12.7 | +10000 |
| HM 3 | 26.1 | 14.0 | +10000 |

The invention claimed is:

1. A radiation crosslinkable pressure sensitive adhesive precursor comprising:
    an acrylate base polymer;
    a co-polymerized type (II) photocrosslinker, in an amount greater than 0.05 parts by weight per 100 parts by weight of acrylate base polymer;
    a co-polymerized hydrogen-donating monomer selected from the group of monomers comprising at least one hydrogen atom on a carbon atom in a α-position to a nitrogen, oxygen or sulfur atom;
    a crosslinking polymer distinct from the acrylate base polymer comprising units derived from the co-polymerized type (II) photocrosslinker; and
    a tackifying resin, in an amount greater than 40 parts by weight per 100 parts by weight of acrylate base polymer.

2. A precursor according to claim 1, wherein the amount of co-polymerized type (II) photocrosslinker is in amount greater than 0.10 parts by weight per 100 parts by weight of acrylate base polymer.

3. A precursor according to claim 1, wherein the amount of acrylate base polymer and co-polymerized hydrogen-donating monomer are selected such as to provide the radiation crosslinked pressure sensitive adhesive obtained by radiation crosslinking, the radiation crosslinkable pressure sensitive adhesive precursor, with a static shear at 70° C. of at least 2000 minutes when measured according to static shear test ASTM D3654.

4. A precursor according to claim 3, wherein the static shear at 70° C. is measured on a UV crosslinked pressure sensitive adhesive layer coated on a substrate, wherein the thickness of the pressure sensitive adhesive layer is typically of about 100 μm, and wherein the UV crosslinking is typically operated with 250 mJ/cm$^2$ UV-B light.

5. A precursor according to claim 1, wherein the amount of tackifying resin is greater than 45 parts by weight per 100 parts by weight of acrylate base polymer.

6. A precursor according to claim 1, which comprises:
    an acrylate base polymer;
    from 0.06 to 1 parts by weight per 100 parts by weight of acrylate base polymer, of a co-polymerized type (II) photocrosslinker;
    from 0.05 to 30 parts by weight per 100 parts by weight of acrylate base polymer, of a co-polymerized hydrogen-donating monomer; and
    from 40 to 80 parts by weight per 100 parts by weight of acrylate base polymer, of a tackifying resin.

7. A precursor according to claim 1, wherein the co-polymerized type (II) photocrosslinker is selected from the group of mono-ethylenically unsaturated aromatic ketones and any combinations or mixtures thereof.

8. A precursor according to claim 1, wherein the co-polymerized hydrogen-donating monomer is selected from the group consisting of (meth)acrylamide, and (meth) acrylic, urethane (meth)acrylic, styrenic, and vinylic monomers containing at least one amine functional group.

9. A precursor according to claim 1, wherein the co-polymerized hydrogen-donating monomer is selected from the group consisting of N,N-dimethyl acrylamide; N-vinyl caprolactam; N-Vinyl pyrrolidone; N-isopropyl acrylamide; N,N-dimethylaminoethyl methacrylate; 2-[[(Butylamino) carbonyl]oxy]ethyl acrylate N,N-dimethylaminopropyl methacrylamide; N,N-diethylaminopropyl methacrylamide; N,N-dimethylaminoethyl acrylate; N,N-diethylaminoethyl acrylate; N,N-dimethylaminopropyl acrylate; N,N-diethylaminopropyl acrylate; N,N-diethylaminoethyl methacrylate; N,N-dimethylaminoethyl acrylamide; N,N-dimethylaminoethyl methacrylamide; N,N-diethylaminoethyl acrylamide; N,N-diethylaminoethyl methacrylamide; and any combinations or mixtures thereof.

10. A method of preparing a radiation crosslinked pressure sensitive adhesive, comprising the steps of:
    providing a radiation crosslinkable pressure sensitive adhesive precursor according to claim 1; and
    radiation crosslinking the radiation crosslinkable pressure sensitive adhesive precursor.

11. An adhesive tape comprising a a radiation crosslinked pressure sensitive adhesive derived from the radiation crosslinkable pressure sensitive adhesive precursor according to claim 1.

12. A precursor according to claim 1, wherein the crosslinking polymer additionally comprises units derived from the co-polymerized hydrogen-donating monomer.

13. A precursor according to claim 1, wherein the base polymer comprises units derived from the co-polymerized hydrogen-donating monomer.

14. A precursor according to claim 1, wherein the base polymer comprises units derived from the co-polymerized type (II) photocrosslinker.

15. A precursor according to claim 1, wherein the crosslinking polymer additionally comprises units derived from the co-polymerized hydrogen-donating monomer and wherein the base polymer comprises units derived from the co-polymerized hydrogen-donating monomer.

16. A precursor according to claim 1, wherein the crosslinking polymer additionally comprises units derived from the co-polymerized hydrogen-donating monomer and wherein the base polymer comprises units derived from the co-polymerized type (II) photocrosslinker.

17. A precursor according to claim 1, wherein the base polymer comprises units derived from the co-polymerized hydrogen-donating monomer and wherein the base polymer additionally comprises units derived from the co-polymerized type (II) photocrosslinker.

18. A precursor according to claim 1, wherein the crosslinking polymer additionally comprises units derived from the co-polymerized hydrogen-donating monomer, wherein the base polymer comprises units derived from the co-polymerized hydrogen-donating monomer, and wherein the base polymer additionally comprises units derived from the co-polymerized type (II) photocrosslinker.

* * * * *

UNITED STATES PATENT AND TRADEMARK OFFICE
CERTIFICATE OF CORRECTION

Page 1 of 2

PATENT NO. : 9,701,873 B2
APPLICATION NO. : 14/442874
DATED : July 11, 2017
INVENTOR(S) : Francois D'Haese It is certified that error appears in the above-identified patent and that said Letters Patent is hereby corrected as shown below:

In the Specification

Column 1
Line 53, delete "hotmelt" and insert -- hot melt --

Column 3
Line 47, delete "tackifing" and insert -- tackifying --

Column 5
Line 48, delete "calorimetry" and insert -- Calorimetry --

Column 9
Line 18, delete "N,N-dimethylamino ethyl" and insert -- N,N-dimethylaminoethyl --
Line 19, delete "2-[[Butylamino)carbonyl]oxy]ethyl acrylate" and insert
-- 2-[[(Butylamino)carbonyl]oxy]ethyl acrylate; --

Column 11
Line 48, delete "Wilimington," and insert -- Wilmington, --
Line 49, delete "Wilimington," and insert -- Wilmington, --

Column 13
Line 39-40, delete "terakis(3-mercaptopropionate)," and insert
-- tetrakis(3-mercatopropionate), --

Column 14
Line 27, delete "holt" and insert -- hot --

Signed and Sealed this
Fifth Day of June, 2018

Andrei Iancu
*Director of the United States Patent and Trademark Office*

Column 21
Line 24, delete "2-[[Butylamino)carbonyl]oxy]ethyl acrylate" and insert
-- 2-[[(Butylamino)carbonyl]oxy]ethyl acrylate; --
Line 37, Delete "N,N-dimethylamino ethyl" and insert -- N,N-dimethylaminoethyl --

Column 22
Line 39, delete "holt" and insert -- hot --

Column 23
Line 57, delete "mJ/cm$^2$UV-B" and insert -- mJ/cm$^2$ UV-B --

Column 24
Line 28, delete "mm/s" and insert -- mm/s. --

Column 25
Lines 1-9, delete "The adhesive strips are then laminated onto the substrate using a 2 kg hand-held rubber-covered roller at a rate of 10+/-0.5 mm/s with 2 passes in each direction. After a dwell time of 20 minutes in the climate room, a 180° peel test is performed using a FP-2255 Peel Tester (manufactured by Thwing-Albert Instrument Company), with data collected and averaged over 10 seconds. Three measurements are made per example and the average recorded in N/inch." and insert the same on Column 25, Line 2, as a new paragraph
Line 15, delete "UIPAC" and insert -- IUPAC --

Column 26
Line 25, delete "14" and insert -- 14: --
Line 30, delete "acetateis" and insert -- acetate is --
Line 64, delete "mm." and insert -- μm. --
Line 67, delete "Hotmelt" and insert -- Hot melt --

Column 28
Lines 30-31, delete "performance" and insert -- performance. --